United States Patent [19]
Fudaki

[11] Patent Number: 5,470,516
[45] Date of Patent: Nov. 28, 1995

[54] METHOD OF MOLDING A SEPARABLE BOTTOM STOP ASSEMBLY ON A CONCEALED SLIDE FASTENER

[75] Inventor: Tsutomu Fudaki, Toyama, Japan

[73] Assignee: Yoshida Kogyo K.K., Tokyo, Japan

[21] Appl. No.: 197,328

[22] Filed: Feb. 16, 1994

[30] Foreign Application Priority Data

Feb. 26, 1993 [JP] Japan ................................... 5-038582

[51] Int. Cl.$^6$ ............................................................. B29D 5/00
[52] U.S. Cl. ......................... 264/135; 24/432; 24/434; 264/136; 264/145; 264/252; 425/545; 425/814
[58] Field of Search ................................. 264/135, 136, 264/137, 252, 145; 425/545, 814; 24/433–436, 432

[56] References Cited

U.S. PATENT DOCUMENTS

| | | | |
|---|---|---|---|
| 1,813,433 | 7/1931 | Sundback | 264/135 |
| 3,103,728 | 9/1963 | Wahl | 264/137 |
| 3,219,743 | 11/1965 | Berler | 425/814 |
| 4,163,768 | 8/1979 | Stephens | 425/814 |
| 4,414,718 | 11/1983 | Kumano | 24/434 |
| 4,505,009 | 3/1985 | Yoshida et al. | 24/434 |
| 4,571,785 | 2/1986 | Akashi | 24/434 |
| 4,627,807 | 12/1986 | Kuse | 425/814 |
| 4,979,288 | 12/1990 | Mayerhofer | 425/814 |

FOREIGN PATENT DOCUMENTS

| | | |
|---|---|---|
| 0021192 | 1/1981 | European Pat. Off. . |
| 0158837 | 10/1985 | European Pat. Off. . |
| 0160983 | 11/1985 | European Pat. Off. . |
| 0368170 | 5/1990 | European Pat. Off. . |
| 2055905 | 5/1971 | France ................................. 425/814 |
| 2401758 | 3/1979 | France . |
| 51-4816 | 10/1976 | Japan . |
| 60-44130 | 10/1985 | Japan ................................. 425/814 |

Primary Examiner—Jay H. Woo
Assistant Examiner—Duane S. Smith
Attorney, Agent, or Firm—Hill, Steadman & Simpson

[57] ABSTRACT

A method of molding a separable bottom stop assembly on a concealed slide fastener, including: forming a number of space portions devoid of fastener elements at predetermined intervals in a concealed slide fastener; impregnating molten synthetic resin in fastener tapes at areas around the space portion; heat-molding and hardening the tapes in such a manner that confronting edge portions of the tapes are turned over; cutting the tapes across the space portion; injection molding a second pin member of the separable bottom stop assembly on the edge portion of one tape and a first pin member of a box member on the edge portion of the other tape at the space portion, contiguously to the fastener elements; and attaching a box to the first pin member to complete the box member. The result is that a separable concealed slide fastener, which could not be put to practical use conventionally, can be manufactured simply.

3 Claims, 4 Drawing Sheets

5,470,516

METHOD OF MOLDING A SEPARABLE BOTTOM STOP ASSEMBLY ON A CONCEALED SLIDE FASTENER

BACKGROUND OF THE INVENTION

1. Field of the Invention

This invention relates to a method for attaching to one end of a fastener chain of a concealed slide fastener a separable bottom stop assembly, which has the function of disconnecting the connected stringers from one another and connecting the disconnected stringers together, according to the fastener closing and opening operation of a slider.

2. Description of the Related Art

In most of conventional concealed slide fasteners, the lower end of a fastener chain is permanently closed by a bottom stop, and a concealed slide fastener of the separable type, in which the fastener chain is separable using a separable bottom stop assembly, could not be put to practical use.

This separable type concealed slide fastener (Japanese Utility Model Publication No. SHO 48-39366) is known in which an auxiliary tape such as of a synthetic resin film or a taffeta tape is attached to the fastener chain's space portion devoid of fastener elements, and a metallic first pin member and a metallic second pin member, both larger than the width of fastener element, are mounted on and around the confronting edges of the space portion, and a special-shape box is attached to the first pin member.

Another conventional concealed slide fastener (Japanese Utility Model Publication No. SHO 51-4816) is known in which an auxiliary tape such as of a synthetic resin film or a taffeta tape is attached to a space portion devoid of fastener elements, and a synthetic resin second pin member and a synthetic resin unitary box member integrally combined of a box and a first pin member are attached to the confronting edges of the space portion by injection molding.

With the conventional separable concealed slide fastener, since the auxiliary tape such as of a synthetic film or a taffeta tape is stuck to a separable bottom end portions of the fastener chain, the thickness of the resulting tapes would be larger than that of the remaining portions, so that the appearance would be unsightly and it is difficult to give a suitable degree of hardness to the separable bottom end portions of the fastener chain, thus causing unsmooth operation of the separable bottom stop assembly.

Further, since the auxiliary tape is attached over the sewing thread staying on the element-free portion, the tape edge portions cannot be turned over accurately so that precise attachment of the box member and the second pin member is difficult to achieve. Therefore no concealed slide fastener with a separable bottom stop assembly has been put to practical use.

SUMMARY OF THE INVENTION

It is therefore an object of this invention to provide a method of molding a separable bottom stop assembly on a concealed slide fastener, in such a manner that the tape thickness of the separable bottom end portions to which the separable bottom stop assembly is to be attached is substantially equal to that of the remaining portions and in such a manner that the element-free edges have an adequate degree of hardness and can be turned over accurately so that precise attachment of the separable bottom stop assembly can be achieved, thus guaranteeing smooth operation of the separable bottom stop assembly.

According to the invention, there is provided a method of molding a separable bottom stop assembly on a concealed slide fastener, comprising the steps of forming a number of space portions devoid of fastener elements at predetermined intervals in a concealed slide fastener, impregnating molten synthetic resin in fastener tapes at areas around the space portion, heat-molding and hardening the tapes in such a manner that confronting edge portions of the tapes are turned over, cutting the tapes across the space portion, injection molding a second pin member of the separable bottom stop assembly on the edge portion of one tape and a box member of the separable bottom stop assembly on the edge portion of the other tape at each of the space portions, contiguously to the fastener elements.

Preferably, the box member includes a first pin member and a box which are molded integrally or separately.

DETAILED DESCRIPTION

A method of molding a separable bottom stop assembly on a concealed slide fastener according to embodiments of this invention will now be described in detail with reference to the accompanying drawings.

Figure 1:
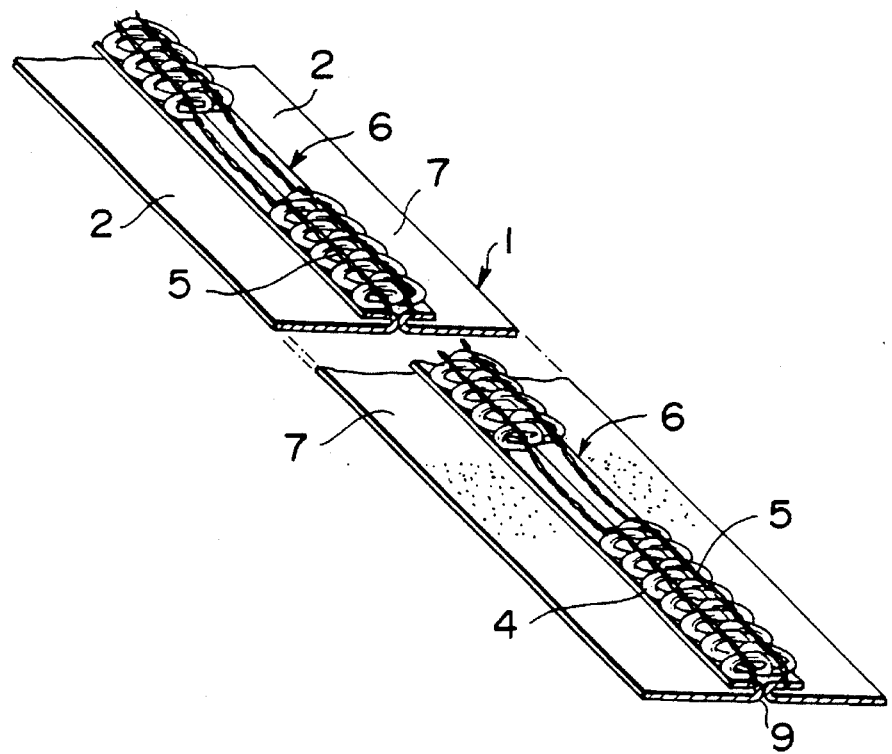
FIG. 1 is a fragmentary perspective view of a fastener chain for a concealed slide fastener.

In the method of molding a separable bottom stop assembly on a concealed slide fastener, as shown in FIG. 1, fastener elements are removed from a predetermined number of prospective space portions (6), on each of which a separable bottom stop assembly 3 is to be mounted, of a fastener chain 1 composed of a pair of stringers 2, 2. Specifically, coupling heads are severed from the fastener elements 4 and the remaining fastener elements 4 are removed off sewing threads 5. In the illustrated embodiment, the fastener elements are synthetic resin coiled fastener elements. Alternatively, they may be metallic fastener elements or injection molded synthetic resin fastener elements. It is essential that the fastener elements should be removed from the edge portions of the fastener tapes 7, irrespective of the type of fastener elements.

Figure 2:
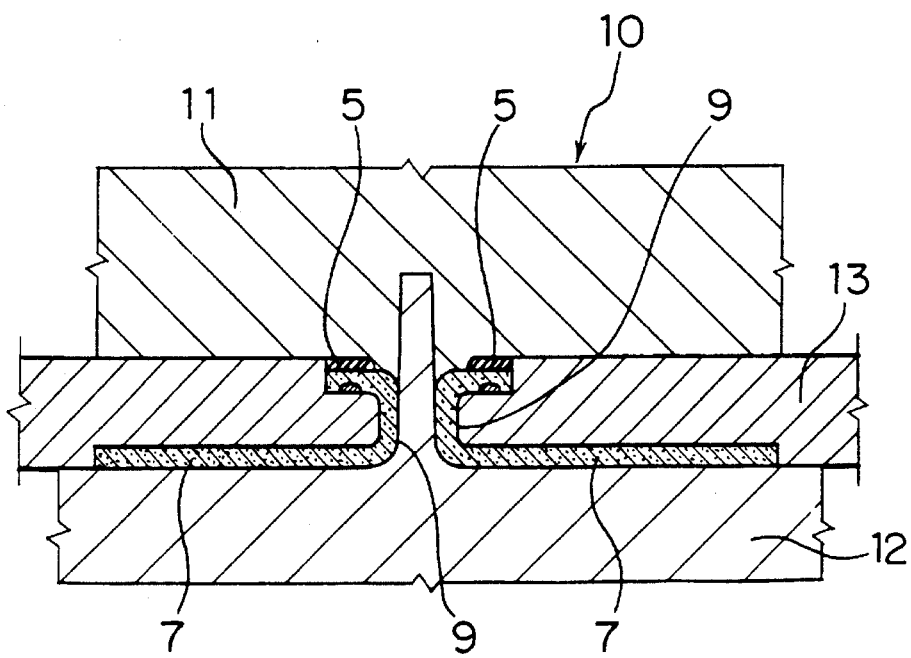
FIG. 2 is a fragmentary cross-sectional view of a heating mold.

The fastener elements 4 are removed from the fastener chain 1 to form the space portions 6, and then molten synthetic resin such as thermoplastic saturated polyester resin or polyurethane resin is impregnated into the entire area of each of the space portions 6 of the fastener chain 1. The space portions 6 are molded under heat and then hardened by a heating mold 10, such as shown in FIG. 2, in such a manner that the tape edge portions on which the sewing threads 5 are remaining are turned over into a U shape, as turns 9, to conform with the folded portions of the remaining stringers 2, 2 where the fastener elements 4 are mounted. The heating mold 10 is composed of an upper die 11, a lower die 12 and slide dies 13.

Figure 4:
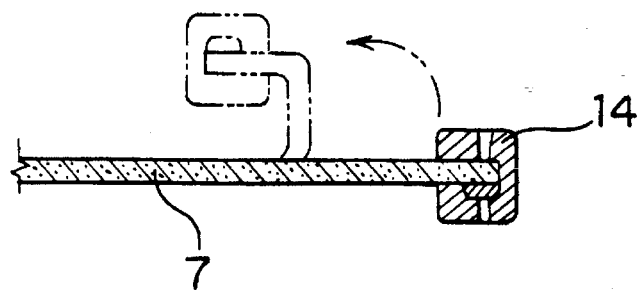
FIG. 4 is a cross-sectional view of one stringer to which a second pin member [of the separable bottom assembly] is attached.
Figure 5:
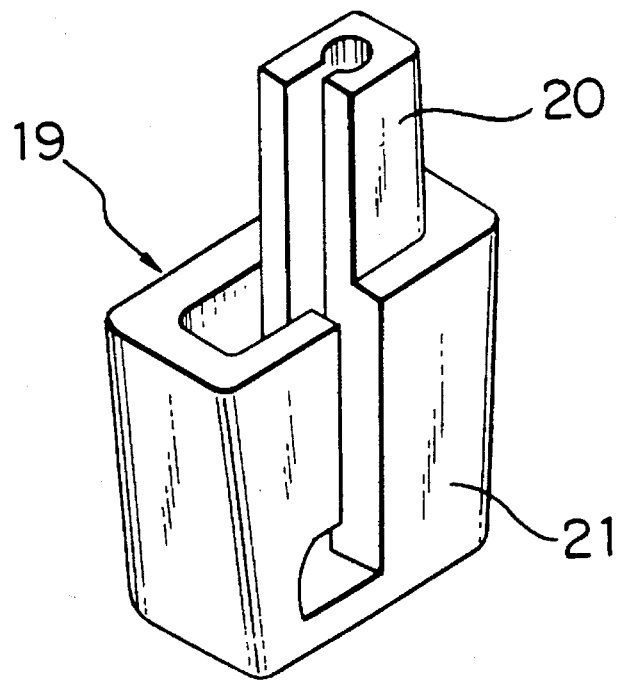
FIG. 5 is a perspective view of a unitary box member in which a first pin member and a box are formed integrally.
Figure 6:
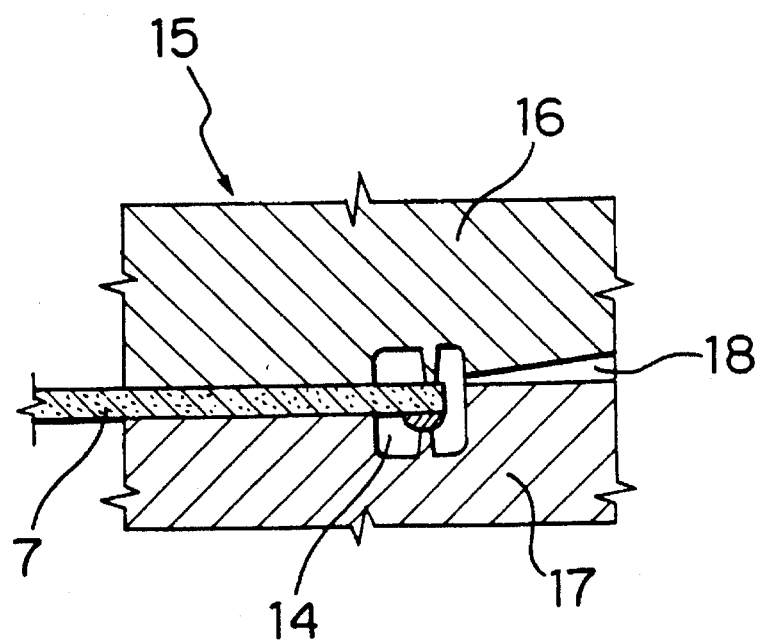
FIG. 6 is a fragmentary cross-sectional view of a mold for injection molding the second pin member.

When one of the successive space portions 6 of the fastener chain 1 is set in a U shape, the tapes 7 are cut across the succeeding space portion 6. Then, a second pin member 14 of the separable bottom stop assembly 3 is injection molded, as shown in FIG. 4, on the tape edge portion of one stringer 2 by an injection mold 15, which is composed of an upper die 16, a lower die 17 and an orifice 18 as shown in FIG. 6. When the tape 7 is removed from the injection mold 15, the tape edge portion at the space portion 6 will restore the U shape as indicated by phantom lines in FIG. 4. On the tape edge portion of the other stringer 2, a box member 19 of the separable bottom stop assembly 3 such as shown in FIG. 5 is injection molded; the box member 19 has a unitary structure in which a first pin member 20 and a box 21 are integrally formed.

Figure 7:
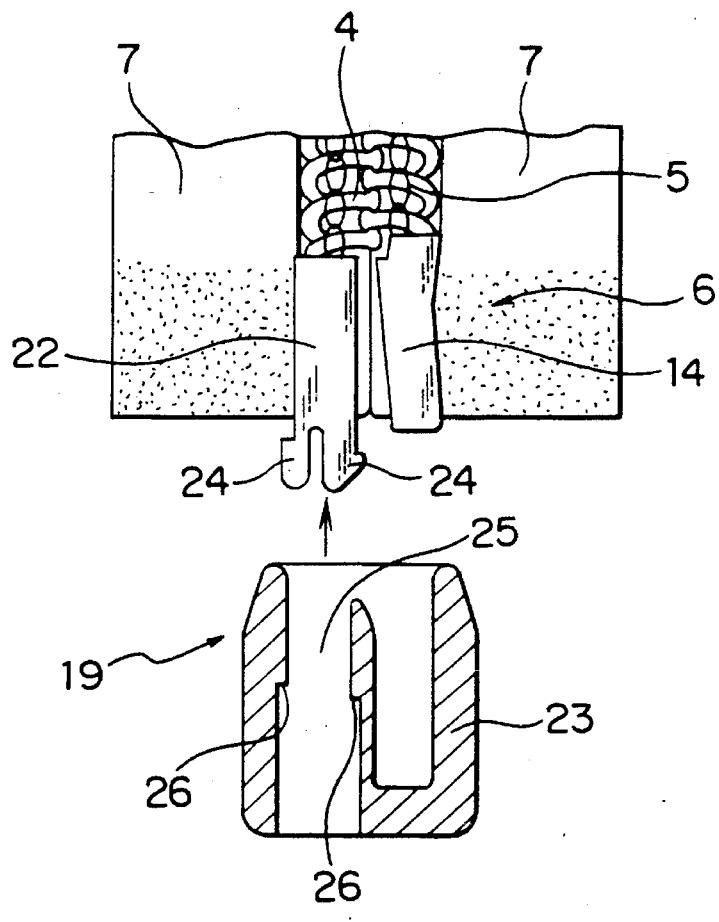
FIG. 7 is an exploded plan view, partially in cross section, of a modified separable bottom stop assembly having a two-piece box in which a first pin member and a box are separate from each other.
Figure 8:
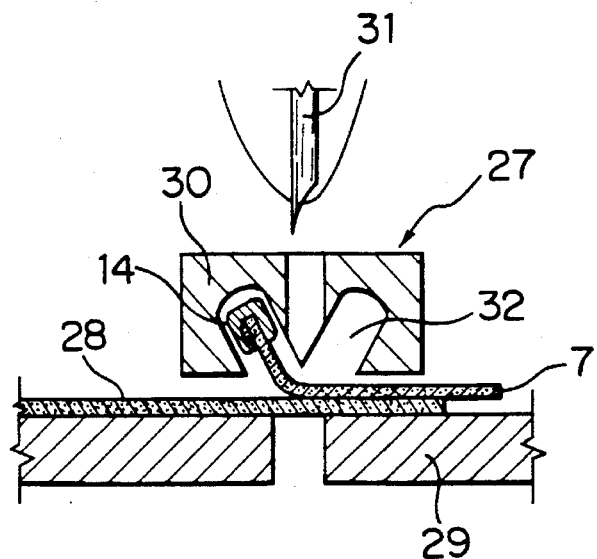
FIG. 8 is a fragmentary cross-sectional view of a sewing machine, showing a pressure foot.

An alternative type box member 19 will now be described. As shown in FIG. 7, this box member 19 has a two-piece structure in which a first pin member 22 and a box 23 are formed separately from each other. Firstly the first pin member 22 in injection molded on one tape edge portion, having on one end locking hooks 24. The box 23 to be locked with the first pin member 22 has catching portions 26 to be engaged with the locking hooks 24 on the inside wall of a hole 25 to which the first pin member 22 is to be inserted. After the fastener chain 1 is sewn to a garment 28 contiguously to the first pin member 22 at the element-free portion by a sewing machine 27 of FIG. 8, the first pin member 22 is threaded into the hole 25 until the locking hooks 24 are caught by the catching portions 26 so that the box 23 is fixed to the first pin member 22 to constitute the box member 19 of the separable bottom stop assembly 3.

Figure 3:
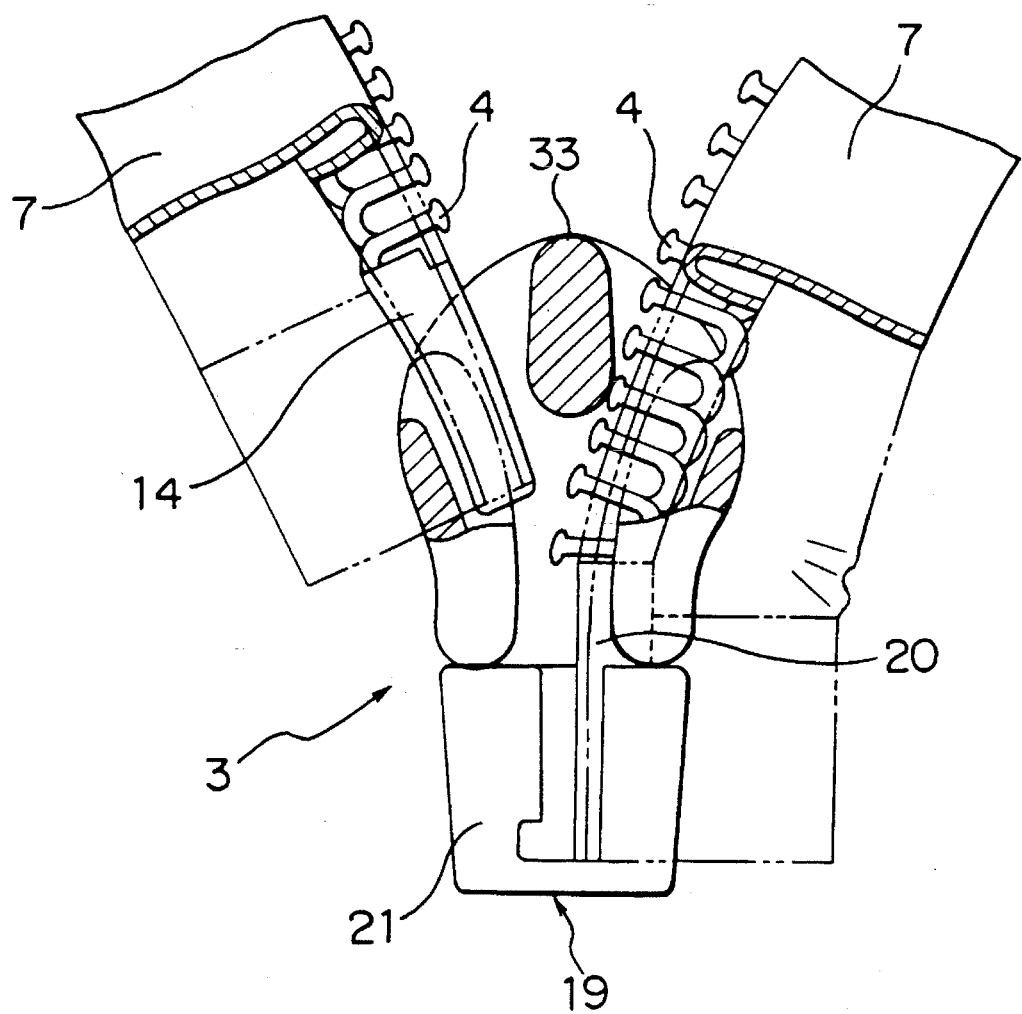
FIG. 3 is a fragmentary plan view of a bottom end portion of the concealed slide fastener.

The sewing machine 27 comprises a table 29, a pressure foot 30 and a sewing needle 31, the pressure foot 30 having a pair of inclined guide grooves 32 in the surface confronting the table 29 for guiding the fastener elements 4, the second pin member 14 and the first pin member 22. 33 in FIG. 3 designates a slider.

The separable bottom stop assembly molding method of this invention has the following results.

According to this invention, the separable bottom stop assembly molding method comprises removing fastener elements 4 from a predetermined number of portions of a concealed slide fastener chain 1 to form a space portion 6, impregnating molten synthetic resin in fastener tapes 7 at areas around the space portion 6, heat-molding and hardening the tapes 7 in such a manner that confronting edge portions of the tapes 7 are turned over, cutting the tapes 7 across the space portion 6; injection molding a second pin member 14 of the separable bottom stop assembly 3 on the edge portion of one tape 7 and a box member 19 of the separable bottom stop assembly 3 on the edge of the other tape 7 at the space portion 6, contiguously to the fastener elements 4. Particularly since molten synthetic resin is impregnated in the fastener chain's element-free portions, to which the separable bottom assembly 3 is to be attached, before heat-molding, it is possible to turn over the type edge portions accurately and easily.

Further, since the tapes 7 of the element-free portions can be treated so as to have a thickness equal to that of the remaining portions of the stringers 2 and so as to have an adequate degree of hardness, the second pin member 14 and the box member 19, or the first pin member 22 can be injection molded at a precise position. Accordingly there is no fear that inferior products might be obtained, facilitating the manufacturing of separable concealed slide fasteners.

Conventionally, in the case where the first pin member 22 and the box 23 are separate from each other, since firstly the first pin member 22 is injection molded on the tape edge portion of one element-free space portion 6 of the fastener chain 1 and then the separately molded box 23 is threaded onto the first pin member 22, it is impossible to sew across the element-free portions contiguously to the first pin member when the concealed slide fastener is attached to a garment, so that the box member can be attached non-stably, which would cause very unsmooth operation of the separable bottom stop assembly. As a consequence, no separable concealed slide fastener could be put to practical use.

Whereas in this invention, since sewing can take place near the first pin member at the element-free space portion, an absolutely new attaching means can be employed and, as a result, the box member 19 can assume a stable posture. It is accordingly possible to perform the separating and joining of the bottom ends of a concealed slide fastener in a very simple operation.

What is claimed is:

1. A method of molding a separable bottom stop assembly on a concealed slide fastener, comprising the steps of:
   (a) removing fastener elements from a selected number of portions of said concealed slide fastener chain to form space portions;
   (b) impregnating molten synthetic resin in fastener tapes at areas around said space portions;
   (c) turning over confronting tape edge portions of fastener stringers of a concealed slide fastener chain longitudinally to have a U-shaped cross section and heat setting said tape edge portions;
   (d) cutting said tapes across said space portions;
   (e) injection molding a second pin member of said separable bottom stop assembly on the edge portion of one tape and a box member of said separable bottom stop assembly on the edge portion of the other tape at each of said space portions, contiguously to said fastener elements, said box member including a first pin member and a box.

2. A separable bottom stop assembly molding method according to claim 1, wherein said box member of said separable bottom stop assembly comprises a first pin member to be firstly injection molded on the edge portion of said tape and an injection molded box to be threaded onto said first pin member.

3. A separable bottom stop assembly molding method according to claim 1, wherein said box member of said separable bottom stop assembly comprises a first pin member and a box which are molded integrally.

* * * * *